United States Patent
Wessells et al.

(10) Patent No.: US 6,755,041 B2
(45) Date of Patent: Jun. 29, 2004

(54) ELECTRICALLY POWERED TRAILER REFRIGERATION UNIT

(75) Inventors: Kyle D. Wessells, Liverpool, NY (US); Peter F. Kaido, Oneida, NY (US)

(73) Assignee: Carrier Corporation, Syracuse, NY (US)

( * ) Notice: Subject to any disclaimer, the term of this patent is extended or adjusted under 35 U.S.C. 154(b) by 581 days.

(21) Appl. No.: 09/915,861

(22) Filed: Jul. 26, 2001

(65) Prior Publication Data

US 2003/0019231 A1 Jan. 30, 2003

(51) Int. Cl.[7] .................................................. F25B 27/02
(52) U.S. Cl. ......................................... 62/236; 62/239
(58) Field of Search ............................ 62/323.3, 236, 62/239

(56) References Cited

U.S. PATENT DOCUMENTS

| | | | | |
|---|---|---|---|---|
| 4,386,309 A | * | 5/1983 | Peschka | ...................... 220/901 |
| 5,998,960 A | * | 12/1999 | Yamada et al. | ............. 320/103 |
| 6,085,533 A | | 7/2000 | Kaido et al. | |
| 6,118,099 A | * | 9/2000 | Lake et al. | .................... 165/43 |
| 6,134,897 A | * | 10/2000 | O'Donnell | ................... 417/902 |
| 6,223,546 B1 | | 5/2001 | Chopko et al. | |
| 6,239,502 B1 | * | 5/2001 | Grewe et al. | ................ 290/1 B |

OTHER PUBLICATIONS

Publication entitled "UTC Makes Commitment to Fuel Cells for Transportation" dated Aug. 4, 1998.
Publication from The Seattle Times—Today's Top Stories, National News, Apr. 30, 1996 entitled "Close-up: 'Battery-powered' electricity plants? One utility's trying it".
U.S. patent application, Ser. No. 09/295,872, entitled "Transport Refrigeration Unit With Synchronous Generator Power System".

* cited by examiner

Primary Examiner—William E. Tapolcai
(74) Attorney, Agent, or Firm—Carlson, Gaskey & Olds

(57) ABSTRACT

An all-electric transport refrigeration system receives its compressor drive motor power and all other electrical power from at least one on-board fuel cell. The fuel cell is able to power all of the refrigeration system electrical components. In one example a single fuel cell is used. Another example includes multiple fuel cells.

8 Claims, 2 Drawing Sheets

ELECTRICALLY POWERED TRAILER REFRIGERATION UNIT

BACKGROUND OF THE INVENTION

This invention generally relates to an improved all-electric truck trailer refrigeration system that receives its compressor drive motor power and all other electrical power from a single on-board electrical power source.

Transport refrigeration systems for a standardized truck trailer having on-board regulated power necessary to operate certain components such as system controls, motors and related devices are known. Typically, the size of the equipment used in truck trailer refrigeration units is restricted to the limited space bounded by the tractor swing radius and the trailer front wall. Such size constraints present a need to utilize arrangements that are as compact as possible.

Typical transport refrigeration applications have included an on-board, small power output generator or alternator and regulator devices. Typical generators are limited to providing power to only a portion of the system, such as fan motors and system controls. On-board generators that are sufficiently large enough to simultaneously provide all the power needed by the transport refrigeration system, including the power to run the compressor drive motor, have typically been too large to be accommodated within the available space. They are also too heavy and too costly to consider for use in conventional transport refrigeration systems.

Another shortcoming of conventional arrangements is that a small internal combustion engine typically is utilized as the source of power. In many instances, the engine is mechanically linked with the appropriate components of the refrigeration system to drive the necessary motors or moving parts. Such engines, while providing sufficient force to power several components in the system have the drawbacks of introducing additional complexity into the system and provide a source of possible pollution. Moreover, the mechanical link arrangements are subject to wear over time and require maintenance or repair.

Therefore, it is desirable to provide a transport refrigeration system with an electrical power system that provides the entire motor and control system power for the refrigeration system while at the same time meeting required space limitations. This invention meets that need while avoiding the drawbacks associated with prior systems.

SUMMARY OF THE INVENTION

This invention is an all electrically powered refrigeration system that receives its power from at least one fuel cell.

A system designed according to this invention includes a compressor. An electric motor provides a motive force to the compressor. There is at least one fan and an electric fan motor that provides a motive force to the fan. A fuel cell is coupled with the fan motor and the electric motor associated with the compressor to selectively provide electrical power to the motors.

In one example, a single fuel cell provides power for the entire refrigeration system. In another example, a plurality of fuel cells are utilized, each for powering selected components of the system.

The unique characteristics of the all-electric power system as employed in the present invention results in a novel transport refrigeration system of reduced size and weight. Further, the nature of the electrically-based power system allows for optimization of the refrigeration system efficiency.

The various features and advantages of this invention will become apparent to those skilled in the art from the following detailed description of the current preferred embodiment. The drawings that accompany the detailed description can be briefly described as follows.

DETAILED DESCRIPTION OF A PREFERRED EMBODIMENT

Figure 1:
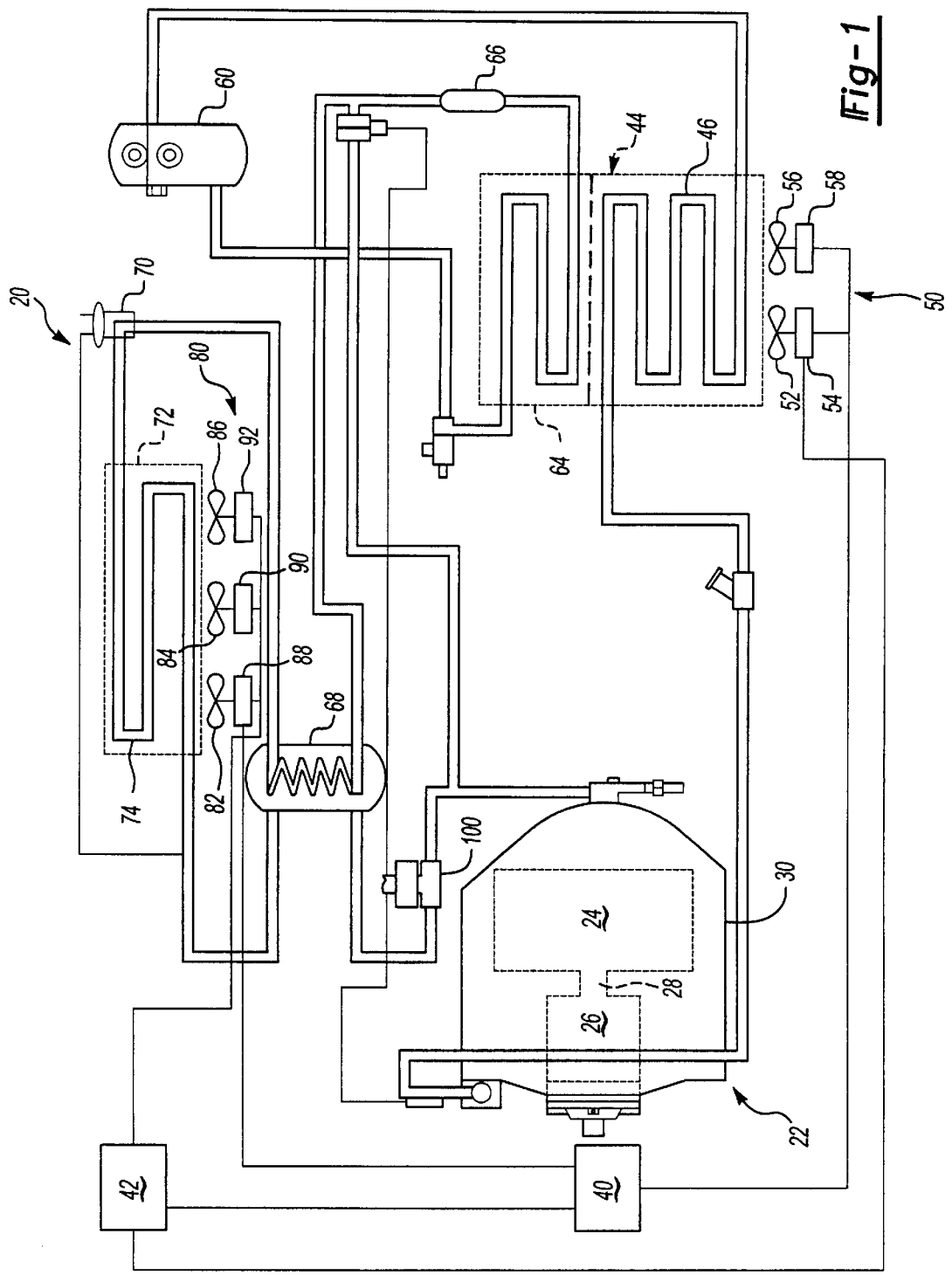
FIG. 1 schematically illustrates an example vehicle refrigeration system having a compressor with an integrated electric drive motor powered by an electrical power system designed according to this invention.

Referring to FIG. 1, a trailer refrigeration system 20 is schematically illustrated with a compressor 22. A compressing mechanism 24, an electric compressor motor 26 and an interconnecting drive shaft 28 are all sealed within a common housing of the compressor 22. In one example, the compressor 22 is a variant of an 06D compressor manufactured by Carrier Corporation. This example compressor has six cylinders and a displacement of 643 cc and is provided with two unloaders, each for selectively unloading a pair of cylinders under selective load conditions.

Electrically-based refrigeration systems for use on transport vehicles are shown in the copending application having Ser. No. 09/295,872 and U.S. Pat. Nos. 6,223,546 and 6,085,533. The teachings of those documents are incorporated by reference into this specification.

A power source 40 that is capable of fully powering the internal electric motor 26 of the compressor preferably also provides power to satisfy the electrical requirements of other portions of the system 20 as will be explained. In one example, the power source 40 is a single fuel cell that provides enough power for all of the dynamic components of the system. The fuel cell provides AC power as needed. A controller 42, which may be a commercially available microprocessor, preferably is programmed to control power usage in the system 20. Programming such controllers is within the skill in the art.

Operation of the refrigeration system 20 can best be understood by starting the compressor 22, where the refrigerant enters the compressor and is compressed to a higher temperature and pressure. Refrigerant gas then moves into the air-cooled condenser 44. Air flowing across a group of condenser coil fins and tubes 46 cools the gas to its saturation temperature. The air flow across the condenser is energized by a condenser fan assembly 50 having two fans. The illustrated example includes fan 52, electrical condenser fan motor 54 and fan 56 having electrical motor 58. The controller 42 preferably regulates power supply to the fan motors.

By removing latent heat, the gas condenses to a high pressure/high temperature liquid and flows to a receiver 60 that provides storage for excess liquid refrigerant during low temperature operation. From the receiver 60, the liquid refrigerant passes through a subcooler heat exchanger 64, through a filter dryer 66 that keeps the refrigerant cool and dry, then to a heat exchanger 68 that increases the refrigerant subcooling, and finally to a thermostatic expansion valve 70.

As the liquid refrigerant passes through the orifice of the expansion valve 70, some of it vaporizes into a gas. Return air from the refrigerated space flows over the heat transfer surface of an evaporator 72. As refrigerant flows through tubes 74 in the evaporator 72, the remaining liquid refrigerant absorbs heat from the return air, and in so doing, is vaporized. The air flow across the evaporator is energized by an evaporator fan assembly 80. The illustrated example includes three fans 82, 84 and 86 that are powered by electric fan motors 88, 90 and 92 respectively. The fan motors 88, 90 and 92 preferably receive their electrical power from the power source 40. The controller 42 preferably controls the consumption of power and the operation of the fan motors of the evaporator fan assembly.

The vapor then flows through a suction modulation valve 100 back to the compressor 22 and integral drive motor 26. A thermostatic expansion valve bulb or sensor is preferably located on the evaporator outlet tube. The bulb is intended to control the thermostatic expansion valve, thereby controlling refrigerant super-heating at the evaporator outlet tubing.

As can be appreciated, the single power source 40 supplies the power needed for the electrical motors associated with the compressor 22, condenser fan assembly 50 and the evaporator fan assembly 80. The preferred embodiment includes a single fuel cell as the power source. This invention includes the realization that fuel cells are a suitable source of electrical power for components such as those used in the refrigeration system 20. Fuel cells have the advantage of being compact and light enough to be incorporated into a transport refrigeration unit as used in this invention. Additionally, fuel cells utilize resources efficiently (i.e., there is minimal loss in the form of heat or mechanical energy).

Figure 2:
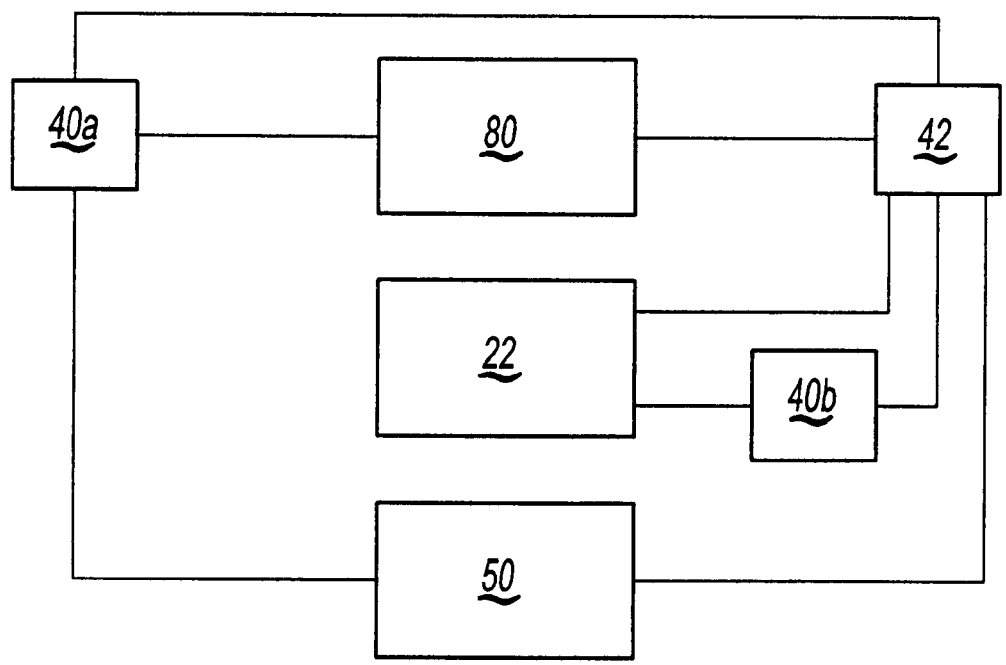
FIG. 2 schematically illustrates portions of another example system where multiple fuel cells provide electrical power to the system.

While the example of FIG. 1 includes a single fuel cell as the power source, other arrangements are within the scope of this invention. FIG. 2 schematically illustrates selective components of a refrigeration system having more than one fuel cell as the power source. In the example of FIG. 2, a first fuel cell 40A provides the electrical power to the condenser fan assembly 50 and the evaporator fan assembly 80. A second fuel cell 40B provides the electrical power to the compressor 22 and more particularly to the electric motor 26 associated with the compressor. Utilizing multiple fuel cells provides the advantage of simplifying the types of connectors and wiring needed to couple all of the dynamic components to the power source. This provides greater flexibility in arranging components, also. The controller 42 preferably is programmed to control the supply of power and the operation of the various electrically powered components in the system.

It should be understood that although the present invention has been described as useful in transport refrigeration systems, those of skill in the art will readily understand and appreciate that the present invention may also be useful, and provide many benefits, in other types of refrigeration systems.

The unique features of the inventive power system coupled with the appropriate compressive mechanism and electric compressor motor results in a transport refrigeration system that affords the desired size, weight, and cost requirements while meeting overall transport refrigeration system power requirements. The inventive, all-electrically powered transport refrigeration system affords greater flexibility as it allows the compressor motor, condenser fan motor, and evaporator fan motor to operate at selected speeds limited only by the capacity of the power source and the components themselves.

While the specifically discussed power source is a fuel cell, this invention extends to systems utilizing other types of power sources of a similar nature such as batteries.

A preferred embodiment of this invention has been disclosed. However, a worker of ordinary skill in this art would recognize that certain modifications would come within the scope of this invention. For that reason, the following claims should be studied to determine the scope of legal protection given to this invention.

The following is claimed:

1. A transport vehicle refrigeration system, comprising:
   a compressor;
   an electric motor that provides a motive force to the compressor;
   at least one fan;
   an electric fan motor that provides a motive force to the fan; and
   a fuel cell that is coupled with the fan motor and the electric motor to selectively provide electrical power to the motors.

2. The system of claim 1, including a single fuel cell that provides the electrical power to the entire system.

3. The system of claim 1, including a plurality of fuel cells.

4. The system of claim 1, including a condenser fan assembly having at least one fan motor and an evaporator fan assembly having at least one fan motor and wherein the fuel cell provides electrical power to the condenser fan assembly and the evaporator fan assembly.

5. A transport vehicle refrigeration system comprising:
   a compressor mechanism;
   an electric motor;
   a shaft coupling the electric motor to the compressor mechanism such that the electric motor provides a motive force to the compressor mechanism;
   a housing that houses the compressor mechanism, electric motor and the drive shaft;
   at least one fan;
   an electric fan motor that provides a motive force to the fan; and
   a stationary power source that generates electrical power based upon a chemical reaction that is coupled with the compressor motor and the fan motor to selectively provide electrical power to the motors.

6. The system of claim 5, wherein the power source comprises a single fuel cell.

7. The system of claim 5, wherein the power source comprises a plurality of fuel cells.

8. A system of claim 5, wherein the power source comprises at least one fuel cell and at least one battery.

* * * * *